United States Patent [19]

Schonball

[11] 4,142,830

[45] Mar. 6, 1979

[54] MECHANICAL OVERLOAD SYSTEMS FOR WIND GENERATORS

[76] Inventor: Walter Schonball, Thuringerstrasse 6, D-53 Bonn, Fed. Rep. of Germany

[21] Appl. No.: 752,088

[22] Filed: Dec. 20, 1976

[51] Int. Cl.² ............................................. F03D 7/04
[52] U.S. Cl. ...................................... 416/41; 416/16; 416/139; 416/142
[58] Field of Search ...................... 416/132 B, 139, 16, 416/41, 9, 40, 42, 148, 131, 140, 121 A, DIG. 6, 4, 142, 145

[56] References Cited

U.S. PATENT DOCUMENTS

| | | | |
|---|---|---|---|
| 756,616 | 4/1904 | Fornander | 416/9 |
| 1,707,235 | 4/1929 | Sargent | 416/227 A X |
| 1,963,912 | 6/1934 | Honnef | 416/121 |
| 2,094,917 | 10/1937 | Dunn | 416/16 X |
| 2,140,152 | 12/1938 | Dunn | 416/16 X |
| 2,533,785 | 12/1950 | Fumagalli | 416/139 X |

FOREIGN PATENT DOCUMENTS

| | | | |
|---|---|---|---|
| 379292 | 8/1923 | Fed. Rep. of Germany | 416/132 B |
| 535625 | 1/1932 | Fed. Rep. of Germany | 416/121 A |

*Primary Examiner*—Everette A. Powell, Jr.
*Attorney, Agent, or Firm*—Robert E. Burns; Emmanuel J. Lobato; Bruce L. Adams

[57] ABSTRACT

Mounted on a vertical axis there is a horizontal axis and, vertically spaced therefrom, a wind wheel generator and counterweight unit. When the wind speed exceeds a predetermined limit, the unit is swung thereby, in a vertical plane, decreasing the effect of the wind on the wheel and protecting it from overload.

2 Claims, 3 Drawing Figures

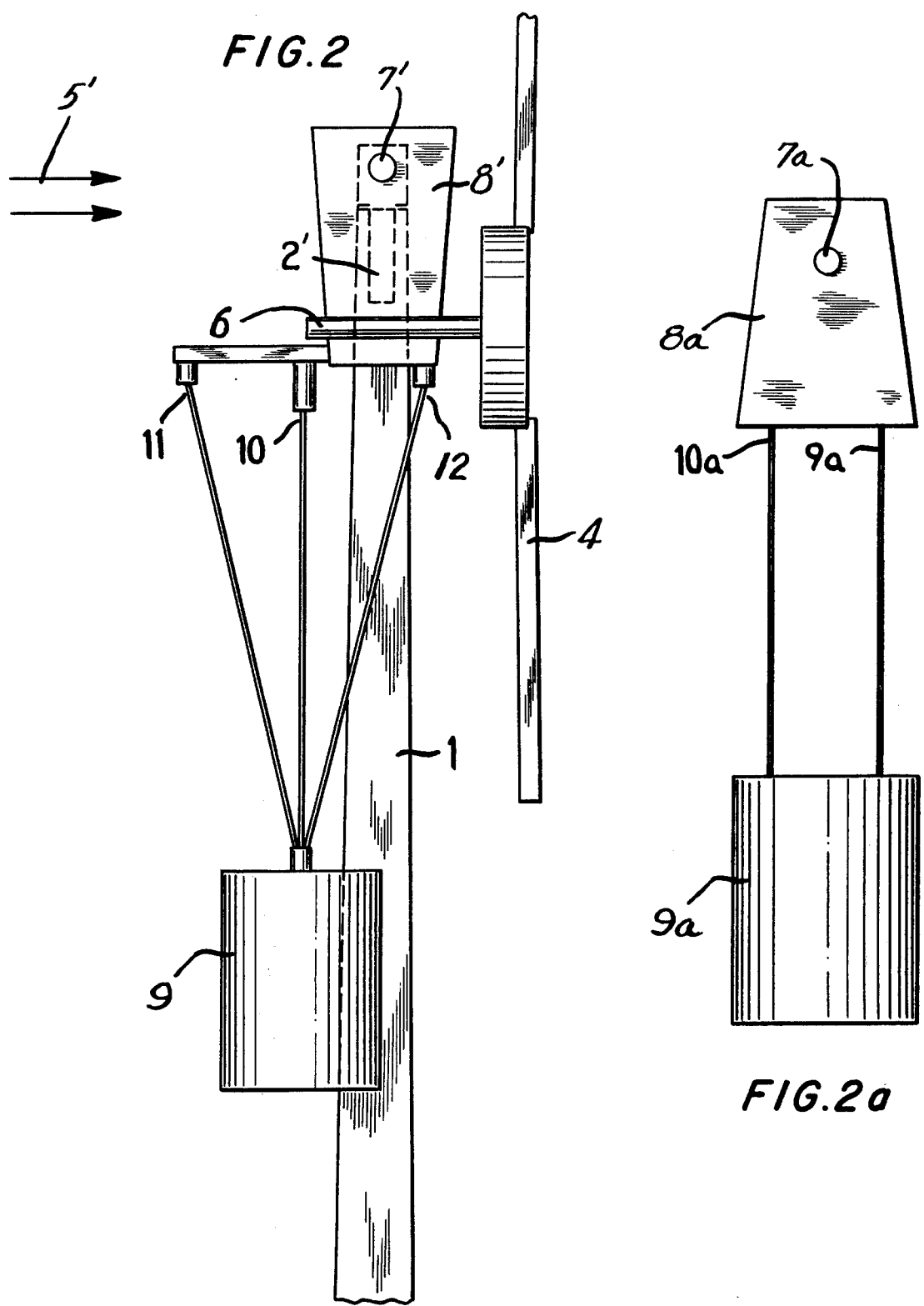

MECHANICAL OVERLOAD SYSTEMS FOR WIND GENERATORS

BACKGROUND OF THE INVENTION

The wind wheel of a wind-operated power generator is, in most cases, mounted on the top of a tower and is arranged in such a way as to have a horizontal axle directed parallel to the wind. In order to obtain a high wind power conversion rate, it is necessary to keep the wind wheel against the wind direction at both low and high wind speeds. However, there is a risk of destruction of the wind wheel or other parts of the wind-operated power generator in high wind speeds due to overload.

It is the objective of the invention to avoid such overload.

It is known that the wind wheel may be turned out of the wind direction in a horizontal plane, i.e. to the right or to the left side. This movement is automatic and effected through the wind by means of a system of axles and springs or by using a vane.

SUMMARY OF THE INVENTION

According to the idea of the invention, the wind wheel will be turned out of the wind direction in a vertical plane, i.e. upwards, the vertical movement being caused directly by the wind pressure against the wind wheel, which is for this purpose supported in unstable balance on a horizontally disposed axle extending across the wind and located below or above the horizontal axle of the wind wheel itself; the wind wheel being counter balanced by means of one or more balancing weights which are secured to the axle of the wind wheel through its bearing or supporting structure. These balancing weights have the further task to pull the wind wheel again into the normal performance position against the wind after it has been pushed upwards in heavy wind speeds. The action and the counter action in this regard are as follows: The arrangement of the two axles, one below and across the other with the balancing weights hung on the axle of the wind wheel, is such that a balancing power acts, normally keeping the axle of the wind wheel in a horizontal position and thereby keeping the wind wheel itself in a vertical plane against the wind. If the wind increases beyond normal condition, i.e. above a predetermined wind speed, the conditions are altered in such a way that the pressure of the wind overcomes the force of the balancing weights and that the wind wheel, turning on the horizontal axle across the wind, is pushed upwards. The balancing weights hung on the horizontal axle of the wind wheel are also pulled upwards by this movement. This movement is gradual and soft according to the grade of the wind force acting. If the wind decreases again below the predetermined limit, the force of the balancing weight becomes stronger than the force of the counteracting wind power. As a consequence, the axle of the wind wheel is pulled back into normal earlier performance position by the balancing weights. It is possible to use a spring or a system of springs instead of balancing weights if all other arrangements remain similar. It is as well possible to alter the arrangement of the wind wheel in such a way that the wheel is inclined in the vertical plane for adaptation of the wind flow if necessary. In addition to this flexibility, a special advantage in comparison with conventional wind-operated power generators is given by the fact that the wind wheel is completely free to turn into any direction the wind force or condition of overload may push, i.e. to horizontal directions and also upwards and downwards, the horizontal movement according to the different wind directions being performed conventionally, e.g. by means of a vane, known by itself. Another advantage is provided by the feature that the arrangement of the plant with two horizontal axles assures a central positioning of the wind wheel and supporting structures on the center of the tower top, i.e. sudden wind gusts or changes in the wind direction cannot exercise fatal shear off forces.

BRIEF DESCRIPTION OF THE DRAWINGS

The following description with reference to the appended drawings which are given by way of example shows the manner by which the invention may be carried into effect.

FIG. 2 is a similar view of a second embodiment;

FIG. 2a is a similar view of a modified fragment.

DESCRIPTION OF THE PREFERRED EMBODIMENTS

Figure 1:
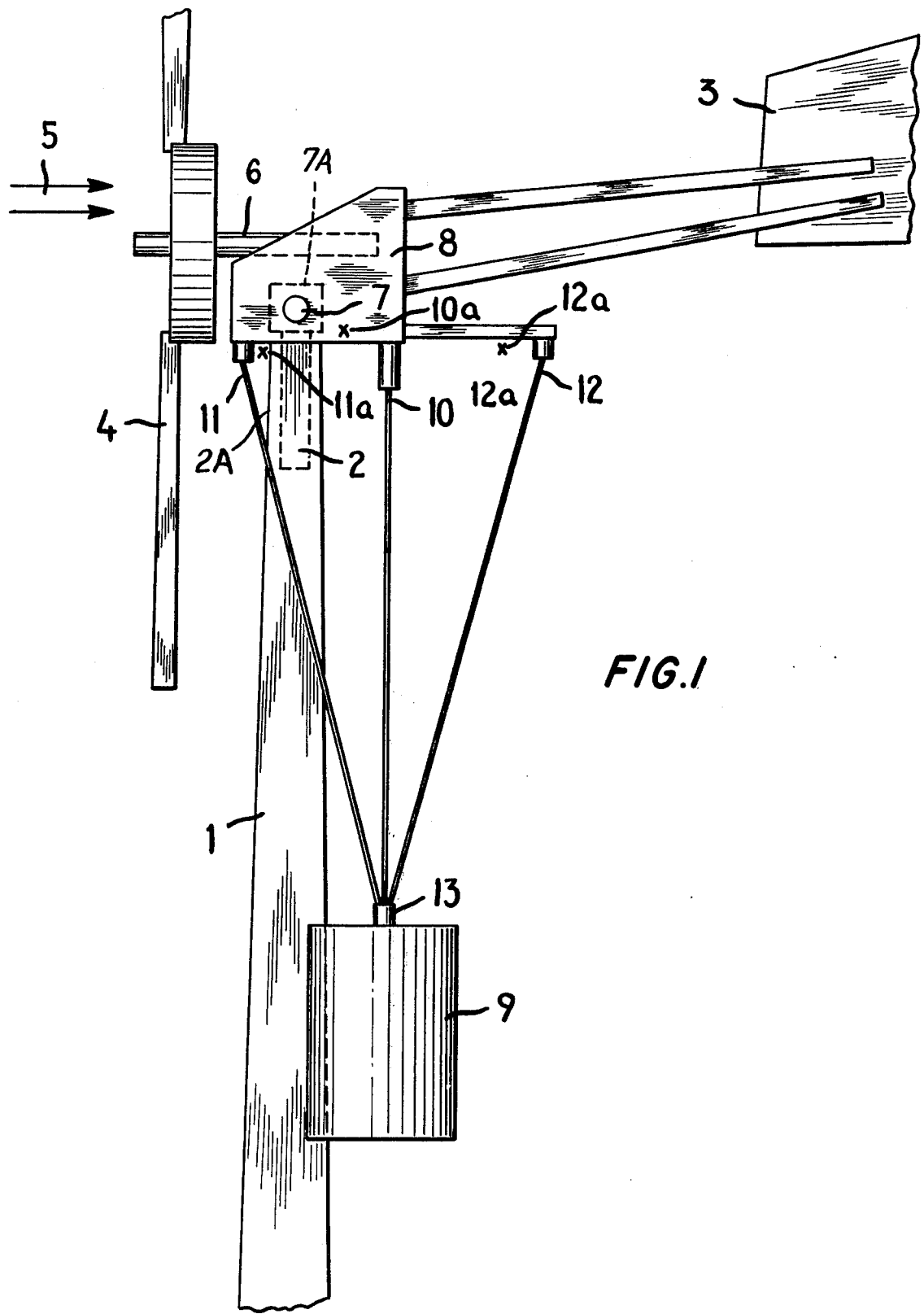
FIG. 1 is a partial side view of a first embodiment of this invention.

FIG. 1 shows the tower 1 of a wind operated generator. A vertical axle 2 is fixed, as shown, to a central top portion 2a of the tower in such a way that the wind wheel and generator unit turns 360° on the horizontal plane following changing wind directions by means of wind vane 3. Wind wheel 4 is placed in front of the tower, i.e. towards wind direction 5. Horizontal axle 6 of the wind wheel is connected with a supporting structure 8 and with the wind vane 3, these three parts 3, 6, 8 forming a unit providing the above-mentioned wind-operated power generator unit. This unit has a horizontal axle 7 extending through the supporting structure 8 and held in bearing means 7a on the top of vertical axle 2, as shown, to mount the unit 3, 6, 8 in unstable balance on axle 7, as mentioned.

Three cables 10, 11 and 12 are hung on the supporting structure 8, on the one hand and support a balancing counter weight 9 on the other hand. The length of the free cables is such that all of them are tight when the wind wheel is drawn into its normal position against the wind as is shown in FIG. 1. However the force of the weight 9 is carried by cable 10 alone, in this position, and cables 11 and 12 act as stabilizing elements. They take the weight 9 when the position of the wind wheel alters, i.e. when the wheel is pushed upwards or pulled downwards. This action is as follows:

The force of the balancing weight 9 is shifted from cable 10 to cable 11 if the pressure of the wind turns the wind wheel 4 with its axle 6 upwards on axle 7. The balancing weight 9 is then pulled upwards by means of cable 11. The wind wheel is, on the other hand, pulled downwards by means of cable 11 when the wind force decreases below the limit predetermined by the effective magnitude of the balancing weight and the other characteristics of the structure. Cable 12 then takes the force of the balancing weight as soon as the normal position of the wind wheel is passed in the opposite direction. In this case, the balancing weight is pulled upwards by means of cable 12.

This movement is stopped within suitable predetermined limits, by stop means, not shown, suitably secured directly or indirectly to tower 1 or axis 2, as will be understood by persons skilled in the art. For example, one of these stops and limits can be chosen and arranged so as to avoid interference of tower 1 with wheel 4. In addition, the illustrated attachment points of cables 10, 11 and 12 may be altered, e.g. to points 10a, 11a, and 12a. It is also possible to alter the length of the cables in order to incline the wind wheel slightly.

FIG. 2 shows a wind-operated power generator with wind wheel 4 arranged off the wind direction 5'. Tower 1 is again fitted with a vertical axle 2 for a horizontal movement of the wind wheel according to changing wind directions. Wind wheel 4 and supporting structure 8' in this case form a two-part unit, to which horizontal axle 7' is attached; a wind vane is not necessary in this case. Axle 7' is above axle 6' of the wheel; and the actions are as follows: The balancing weight 9 is hung on cable 10. Cables 11 and 9 are tight. Wind wheel 4 with its axle 6' and supporting structure 8' can again be pushed upwards by the wind force and the force of the balancing weight is then shifted from cable 10 to cable 9 which cable pulls the weight upwards as well. The balancing weight pulls the wind wheel back into normal performance position as soon as the wind decreases below the predetermined limit. Cable 11 takes the weight of the balancing weight if the movement passes the normal position of the wind wheel into the opposite direction. This movement is stopped within predetermined limits, and the weight pulls the wind wheel back into position by means of cable 11. In this way, all parts of the wind driven power generator are movable and no sudden overload or destruction is possible.

FIG. 2a shows an arrangement with only two cables, 9a, 10a supporting weight 9a.

I claim:

1. A wind operated power generator drive unit, comprising;

a first, normally horizontal axle;

a wind wheel secured to an end portion of the axle for driving, in use, a power generator;

means for keeping the axle parallel to a wind direction; and a support, comprising, a second axle disposed horizontally and in a plane transversely of the first axle, means for supporting the first axle and the wind wheel thereon in unstable balance from the second axle for a reversible upward movement of the first axle and of the wind wheel thereon under a high pressure of the wind, balancing means comprising a weight for balancing the first axle and the wind wheel thereon relative to the second axle, and means having three cables attaching the balancing weight to the first axle in such a way that a balancing force acts against the upward movement of the first axle and of the wind wheel thereon to normally keep the first axle and wind wheel in a predetermined position relative to the second axle and to return them to such predetermined position after their upward movement when the high pressure of the wind ceases, said three cables consisting of a center cable depending downwardly on which said weight is suspended disposed rearwardly of said second axle, a second cable connected intermediate said wind wheel and said second axle effective to apply said balancing force downwardly as said wind wheel tilts upwardly, and a third cable remote from said second cable with said outer cable between said second cable and said third cable effective to apply a balancing force to keep the first axle and windwheel in said predetermined position when the wind wheel tilts downwardly.

2. A unit according to claim 1, in which the first axle is mounted above the second axle between the wheel and the means for keeping the axle parallel to the wind.

* * * * *